April 13, 1926.
T. G. RICHARDS
1,580,857
LAMINATED ARTICLE
Filed Jan. 7, 1925
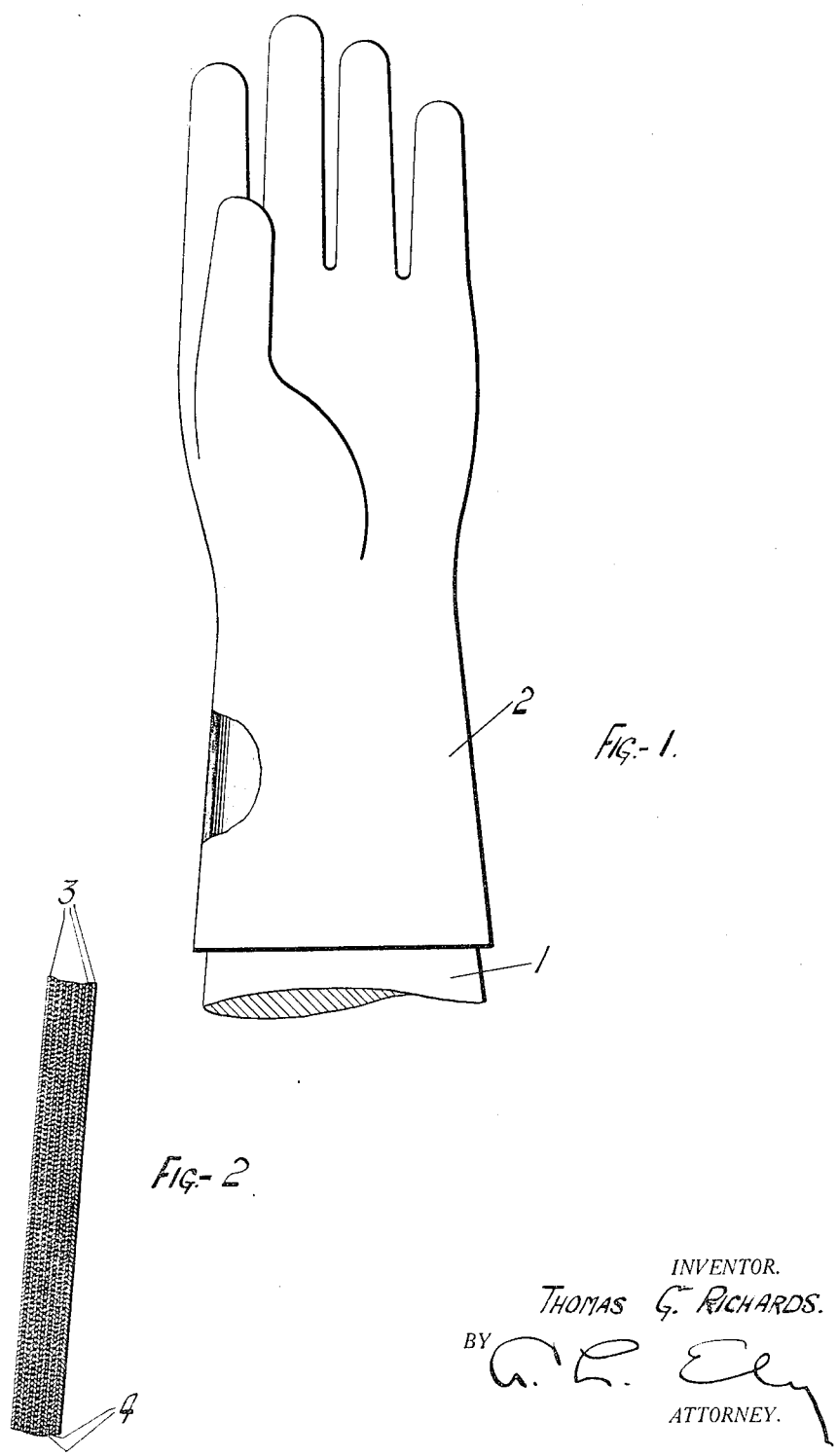
INVENTOR.
THOMAS G. RICHARDS.
BY
ATTORNEY.

Patented Apr. 13, 1926.

UNITED STATES PATENT OFFICE.

THOMAS G. RICHARDS, OF BARBERTON, OHIO.

LAMINATED ARTICLE.

Application filed January 7, 1925. Serial No. 1,099.

*To all whom it may concern:*

Be it known that I, THOMAS G. RICHARDS, a citizen of the United States, and a resident of Barberton, county of Summit, State of Ohio, have invented certain new and useful Improvements in Laminated Articles, of which the following is a specification.

The use of X-ray machines is attended with injurious effects upon the operators, or those whose work requires attendance on or near the machines, the rays being dangerous to human organisms, as is well known to those familiar with their use.

It is the purpose of the present invention to provide a material which, when worn, will serve to protect the operators from the injurious effects of the rays, and for this purpose I propose to use metallic lead, one of the properties of which is that it intercepts the X-rays. Should substances other than metallic lead be found to have similar properties, it is intended to cover the use of such substances as well.

In the drawings herein, there is shown one form of the invention, and for the purpose of illustration I have shown and described the manufacture of a glove, but it will be understood that the invention may be practised in the manufacture of other articles of wearing apparel, such as aprons, coats, or the like. Other changes and modifications may be made in the practising of the invention. The method of manufacturing the article is covered by the copending divisional application hereof, Serial No. 73156, filed December 4, 1925.

In the drawing:

Figure 1 shows a glove upon a form and constructed in accordance with the invention; and Figure 2 is a fragmentary cross-section of the finished product upon a magnified scale, showing the construction of the several layers which constitute the laminated structure.

In describing the invention I have shown a seamless rubber glove which is manufactured upon a form such as shown at 1. This is made of glass or porcelain and is dipped in a solution of rubber a sufficient number of times to build up a glove 2 of the proper thickness. After each dipping, and while the layers of rubber are in a tacky condition, a fine coating of powdered metallic lead is sprinkled over and adheres to the rubber. The dipping and sprinkling processes are repeated until the desired thickness of the material is built up. The glove is then vulcanized in the usual manner.

The structure of the article is illustrated in Figure 2, in which the successive layers of rubber are indicated by the numeral 3 and the intervening layers by the numeral 4.

The glove constructed in the manner described has been found to possess the property of protecting the operator from the injurious effects of the rays, and so far known to me is the first practical construction for the uses and purposes set forth. The lead is impermeable to X-rays and the articles are flexible and can be used in the same manner as the ordinary rubber glove.

In constructing other articles of wearing apparel, the method of forming the layers of rubber may be varied as dictated by the character of the article to be manufactured and I do not intend to be limited to the particular method or to the specific articles herein shown and described.

What is claimed is:

1. A flexible, protective covering for use by X-ray operators comprising layers of rubber and layers of metallic lead adhesively secured to the layers of rubber and vulcanized therewith.

2. A flexible, protective covering for use by X-ray operators comprising a thin layer of rubber and a thin layer of powdered lead permanently secured thereto by vulcanization.

3. A flexible, protective covering for use by X-ray operators, said covering containing powdered lead in a layer over the extent of the covering between layers of rubber.

4. A one-piece, flexible, protective covering for use by X-ray operators comprising a plurality of layers, one of said layers containing a substance impermeable to X-rays, said substance being distributed evenly throughout the covering.

5. A garment comprising successive layers of rubber and powdered lead in sufficient volume to render the garment impermeable to X-rays.

6. A garment comprising thin layers of rubber and thin layers of a material impermeable to X-rays.

7. A laminated sheet comprising thin layers of rubber and thin layers of powdered lead in sufficient volume to render the sheet impermeable to X-rays.

8. A laminated flexible sheet comprising thin layers of rubber and thin layers of a substance impermeable to X-rays adhesively secured to the layers of rubber and vulcanized thereto.

9. A laminated flexible structure comprising a layer of rubber and a layer of a substance impermeable to X-rays, the said layers being vulcanized together.

THOMAS G. RICHARDS.